UNITED STATES PATENT OFFICE.

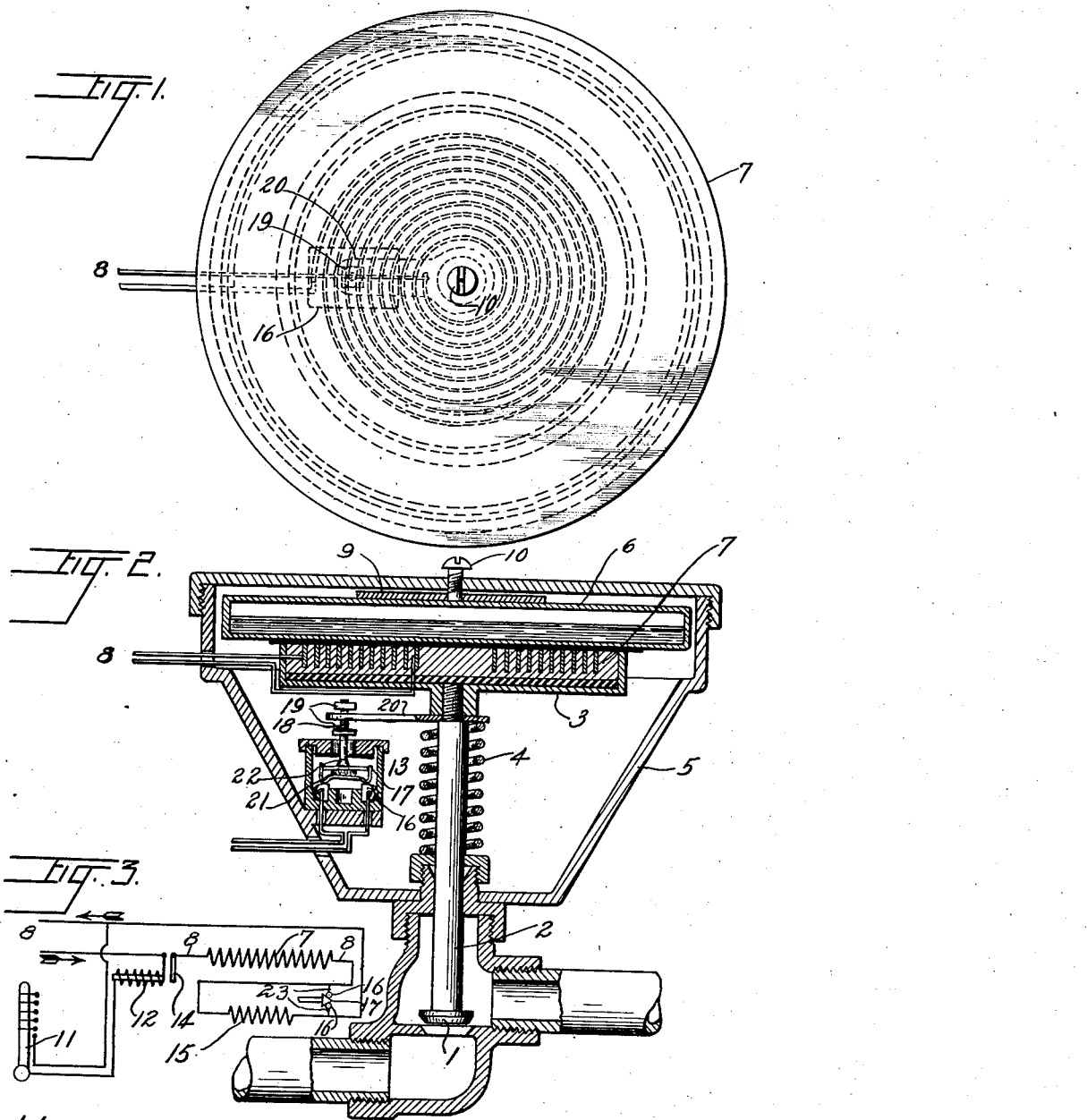

LEE P. HYNES, OF CHICAGO, ILLINOIS, ASSIGNOR TO RAILWAY UTILITY CO., OF CHICAGO, ILLINOIS, A CORPORATION OF ILLINOIS.

THERMOSTATIC VALVE MECHANISM.

1,115,545.  Specification of Letters Patent.  Patented Nov. 3, 1914.

Application filed January 15, 1912. Serial No. 671,364.

*To all whom it may concern:*

Be it known that I, LEE P. HYNES, a citizen of the United States of America, and a resident of Chicago, county of Cook, State of Illinois, have invented certain new and useful Improvements in Thermostatic Valve Mechanisms, of which the following is a specification.

The main objects of this invention are to provide a simple and improved form of valve mechanism adapted to operate under the control of the thermostat; to provide certain improvements in the construction of devices of this kind; to provide an improved device of this kind in which the movement of the valve is controlled by the expansion and contraction of a fluid through the action of an electric heater; and to provide improved means for controlling the supply of current to said heater.

The accompanying drawings illustrate a specific embodiment of this invention, arranged for controlling the supply of heating medium to a heating appliance such as a steam radiator.

Figure 1 is a top plan of the parts shown in Fig. 2. Fig. 2 is a vertical section of a valve having operating mechanism constructed for thermostatic control in accordance with this invention. Fig. 3 is a diagram of the electrical connections for operating the device shown in Figs. 1 and 2.

In the construction shown in the drawings, the radiator valve 1 is carried by a vertically slidable stem 2, which has a disk or head 3 at its upper end, and which is normally urged to an open position by means of a spring 4. The upper part of the valve stem is surrounded by a suitable housing 5 having seated in its upper part a closed, hollow, disk-shaped casing 6, which is filled with a readily expansible fluid, such as alcohol.

The disk 3 has a flange around its edge to provide a seat for an electric heating element 7, which is connected by line wires 8 with a suitable source of current. The heater may be in the form of a coil of wire or metal ribbon embedded in a suitable cement, and is, of course, insulated from the casing 6 and disk 3. The insulation is arranged to favor the transmission of heat to the casing 6 and to prevent the flow of heat from the heater and casing to the disk 3. The upper and lower walls of the casing 6 are thin and serve as a diaphragm, movable through pressure changes due to expansion and contraction of the fluid contents of the casing 6, and said casing is located between the disk 3 and a second disk or abutment 9 which is adjustable by means of a screw 10 to regulate the open position of the valve 1 and also the pressure exerted by the spring 4 upon the contents of the casing.

A thermostat 11, represented diagrammatically in Fig. 3, is arranged to actuate a relay 12 bridged across the line in series with the thermostat for closing a switch 14 in the line circuit of the heater 7. A switch 13 bridged across the line by wires 23 also controls the line circuit for cutting in resistance 15 by the expansion of the contents of the casing 6, as illustrated in Fig. 1. The resistance 15 reduces the current to heater and is so proportioned as to maintain the heater at a certain low temperature.

The switch 13, as illustrated in Fig. 2, has a pair of stationary contacts 16 bridged by a movable contact 17, slidably carried on the stem 18. This stem coacts with an arm 20 carried by the valve stem 2 so as to cause the contact member 17 to shift into and out of engagement with the contacts 16 through the movement of the valve stem 2. As the valve stem 2 has considerably greater range of movement than does the stem 18 of the switch 13, said stem is provided with adjustable nuts or shoulders 19 which are spaced apart a sufficient distance to provide the desired amount of lost motion. In the particular form of switch which is illustrated, the position of the contact member 17 is controlled by a spring 21, the ends of which are brought together so as to form a contractible annular spring. This coacts with a double cone 22 on the stem 18. It will be seen that when the stem is raised, the spring will pass the widest part of the cone and will force the contact member 17 downward into engagement with the contact members 16. A reverse movement of the stem causes the spring to pass the middle of the cone and through its resilience raises the contact member 17.

The operation of the device shown is as follows:—The thermostat is set for the desired temperature. As the valve 1 is normally held open by the spring 4, steam or other heating medium will be admitted to the radiator and the temperature of the room will rise until it reaches the predetermined temperature for which the thermostat has been set, whereupon the thermostat will close the circuit of the relay 12, moving the switch arm 14, and thereby closing the circuit of the heater 7. The current flowing through the heating coil 7 raises the temperature of the fluid in the casing 6, causing it to expand until it closes the valve 1. The downward movement of the valve stem 2 shifts the stem 18 downwardly, opens the switch 13, and inserts resistance 15. This reduces the current to an amount just sufficient to keep the valve closed.

It will be seen that if the temperature of the room falls below the temperature for which the thermostat is set, the circuit of the relay 12 will be opened, allowing arm 14 to completely open the circuit to the heater. The metal walls of the casing 6 will dissipate the heat and cause the fluid therein to cool and contract, thereby allowing the valve 1 to return to its open position. The circuit is now closed at the switch 13 and is again ready for control by the thermostat. If the temperature of the room rises above the predetermined temperature, the circuit of the relay 12 will be closed by the thermostat, and as this sets in operation the heating coil 7, the valve 1 will be closed and will be held closed until the thermostat again acts to open the circuit at 14. If the heat of the room has fallen sufficiently to cause the thermostat to open the relay circuit, the casing 6 will cool and contract, the stem will rise and the line resistance switch will accordingly close at 13 and the operation of the heating coil 7 will not occur until the thermostat again reaches the predetermined temperature.

Although but one specific embodiment of this invention is herein shown and described, it will be understood that numerous details of the construction shown may be altered or omitted without departing from the spirit of this invention, as defined by the following claims.

I claim:—

1. In a device of the class described, the combination of a valve, means normally urging said valve to one position, an expansible casing adapted to contain an expansible fluid and arranged to shift said valve to another position, an electric heater arranged to heat said fluid, a switch arranged for controlling said heater and mechanical means controlling said switch and actuated through the movement of said valve.

2. In a device of the class described, the combination of a valve, means normally urging said valve to an open position, an expansible casing adapted to contain an expansible fluid and arranged to close said valve through the expansion of said fluid, an electric heater arranged to heat said fluid, a thermostat mainly controlling said heater, a switch supplementing control of said heater, and mechanical means movable with said valve for actuating said switch.

3. The combination of a valve, means normally urging said valve to an open position, a metallic casing adapted to contain an expansible fluid and having a diaphragm movable through the expansion of such fluid and located to close said valve through such expansion, an electric heater adjacent to said casing for influencing said fluid, a supply circuit for said heater, a thermostat adapted to control the opening and closing of said supply circuit, resistance, and a switch arranged for mechanical control by said diaphragm to cut said resistance into and out of said supply circuit through the movement of said diaphragm.

4. In a device of the class described, the combination of a valve, means normally urging said valve to an open position, an expansible casing adapted to contain an expansible fluid and arranged to close said valve through the expansion of said fluid, an electric heater arranged to heat said fluid, a thermostat and relay mainly controlling said heater, and a switch independent of said thermostat and relay and mechanically connected and controlled through the movement of said valve to vary the current delivered to the heater.

Signed at Chicago this 10th day of January 1912.

LEE P. HYNES.

Witnesses:
 EUGEN A. RUMMLER,
 EDWIN PHELPS.